United States Patent [19]
Brownlee et al.

[11] Patent Number: 5,370,451
[45] Date of Patent: Dec. 6, 1994

[54] CUTTER ASSEMBLY FOR A WHEELED TRACTOR

[75] Inventors: David M. Brownlee, Douglasville, Ga.; Richard Dolk, Lakeworth, Fla.

[73] Assignee: WMX Technologies, Inc., Oak Brook, Ill.

[21] Appl. No.: 147,922

[22] Filed: Nov. 5, 1993

[51] Int. Cl.[5] .............................................. B60S 1/62
[52] U.S. Cl. .......................................... 305/12; 305/11
[58] Field of Search ................... 305/11, 12; 280/855

[56] References Cited

U.S. PATENT DOCUMENTS

| | | | |
|---|---|---|---|
| 3,976,337 | 8/1976 | Vaughn | 305/12 |
| 4,818,040 | 4/1989 | Mezzancella | 305/12 |
| 4,830,439 | 5/1989 | Collins et al. | 305/11 |

FOREIGN PATENT DOCUMENTS 8301234 4/1983 WIPO .................................. 305/12

OTHER PUBLICATIONS

Letter and attached advertisements directed to a wheel cleaning protection system offered for sale by Freeman Equipment, Inc. dated Dec. 17, 1992.

*Primary Examiner*—Russell D. Stormer
*Attorney, Agent, or Firm*—Allegretti & Witcoff, Ltd.

[57] ABSTRACT

A system for preventing entanglement of a wheeled tractor with wire or other wrappings, the system having at least one cutter assembly mounted to the frame of the tractor and designed to shear wire or other materials that can lodge between the axles and wheels of the tractor. The system can have two different cutter assemblies, one as described and one that moves in a scissor-like motion in synchronization with the undulating motion of the tractor's rear axle.

6 Claims, 2 Drawing Sheets

CUTTER ASSEMBLY FOR A WHEELED TRACTOR

BACKGROUND

This invention relates to a system for preventing entanglement of a wheeled tractor with wire or other types of wrapping materials. In particular, the system of this invention is directed for use on a tractor used to compact refuse in a landfill environment. Such landfill tractors operate in adverse conditions and are subject to various types of debris such as wire, metal and plastic strapping, cable and other wrappings that can wrap around the axles of the tractor and ultimately bind the wheels causing damage. Moreover, a significant number of man-hours is required to manually remove entangled wrappings from the axles. Of general interest in the prior art relating to cleaning wheeled tractors are U.S. Pat. No. 4,830,439 (Collins et al.), U.S. Pat. No. 4,818,040 (Mezzancella et al.), U.S. Pat. No. 3,976,337 (Vaughn).

Although the prior art has recognized the need for removal of or prevention of material building up between the axles and wheels of tractor-type vehicles, these prior art devices are directed solely to scrapper plates not the wire cutting assemblies of this invention.

SUMMARY OF THE INVENTION

The principal object of this invention is to overcome the above-described problems by providing a system of cutting assemblies that prevent wire or other wrappings from entangling the axles of wheeled tractors and thus avoiding expensive maintenance and the loss of use of the tractor while being repaired.

Accordingly, one embodiment of this invention relates to a cutting system for preventing wire or other wrappings from entangling the axles of a wheeled tractor that traverses a defined ground space, wherein the tractor has a frame, a front axle and a moveable rear axle, both supporting wheels having inside cones which have mounted thereto a series of wear bars. The cutting system comprises a wire cutter assembly secured to said frame, said wire cutter comprises two parallel plates extending outwardly from said frame above said front axle and in a direction substantially parallel to said front axle, each of said parallel plates are positioned to be in close proximity to said wear bars creating a cutting surface that cuts wire or other wrappings that come between said plates and said wear bars.

A further embodiment is directed to a cutting system for preventing wire or other wrappings from entangling the axles of a wheeled tractor, wherein the tractor has a frame, a front axle and a moveable rear axle, both supporting wheels having inside cones containing a series of wear bars. The cutting system comprises a rear wire cutter assembly secured to said frame, said wire cutter comprises a first jaw and a second jaw, said first jaw having a first cutting plate and a second cutting plate, said first jaw is secured to said rear axle and moves in a rocking motion as said rear axle moves up and down as said wheels move and traverse the contour of the ground, said second jaw is secured to said frame and has two parallel plates spaced a distance apart to accept said second cutting plate as said second plate moves in a scissor-like fashion as a result of the rocking motion caused by the movement of said rear axle.

A still further embodiment relates to a cutting system comprising a front wire cutter assembly secured to a frame of a wheeled tractor, said front wire cutter comprises two parallel plates extending outwardly from said frame above said front axle and in a direction substantially parallel to said front axle, each of said parallel plates are positioned to be in close proximity to wear bars mounted to the inside cones of the wheels creating a cutting surface that cuts wire or other wrapping that come between said plates and said wear bars; and a rear wire cutter assembly comprising a first jaw and a second jaw, said first jaw having a first cutting plate and a second cutting plate, said first jaw is secured to said rear axle and moves in a rocking motion as said rear axle moves up and down as the tractor wheels move and follow contour of the ground, said second jaw is secured to said frame and has two parallel plates spaced a distance apart to accept said second cutting plate as said second plate moves in a scissor-like fashion as a result of the rocking motion of said rear axle.

These as well as other objects and embodiments will become evident from the following, more detailed description of the present invention.

DESCRIPTION OF THE CURRENT EMBODIMENTS

The present invention relates to an improved cutter system for preventing and removing wire or other wrappings from becoming entangled around the axles of a wheeled tractor. The cutter system provides cutting edges that work in cooperation with the wear bars of a tractor wheel to cut wire or other wrappings that get between the wheel and axle. The system also provides a cutting assembly that utilizes the up and down movement of the rear axle to work two jaws in a scissor-like fashion to cut materials that fall between the axle and frame of the tractor. Finally, the system provides a plurality of v-shaped notches to trap and prevent wire or other wrapping from getting between the axle and the wheel. These v-shaped notches allow the tractor operator to more easily manually cut the trapped wrappings. The cutter system of this invention is better understood by reference to FIGS. 1 and 2.

Figure 1:
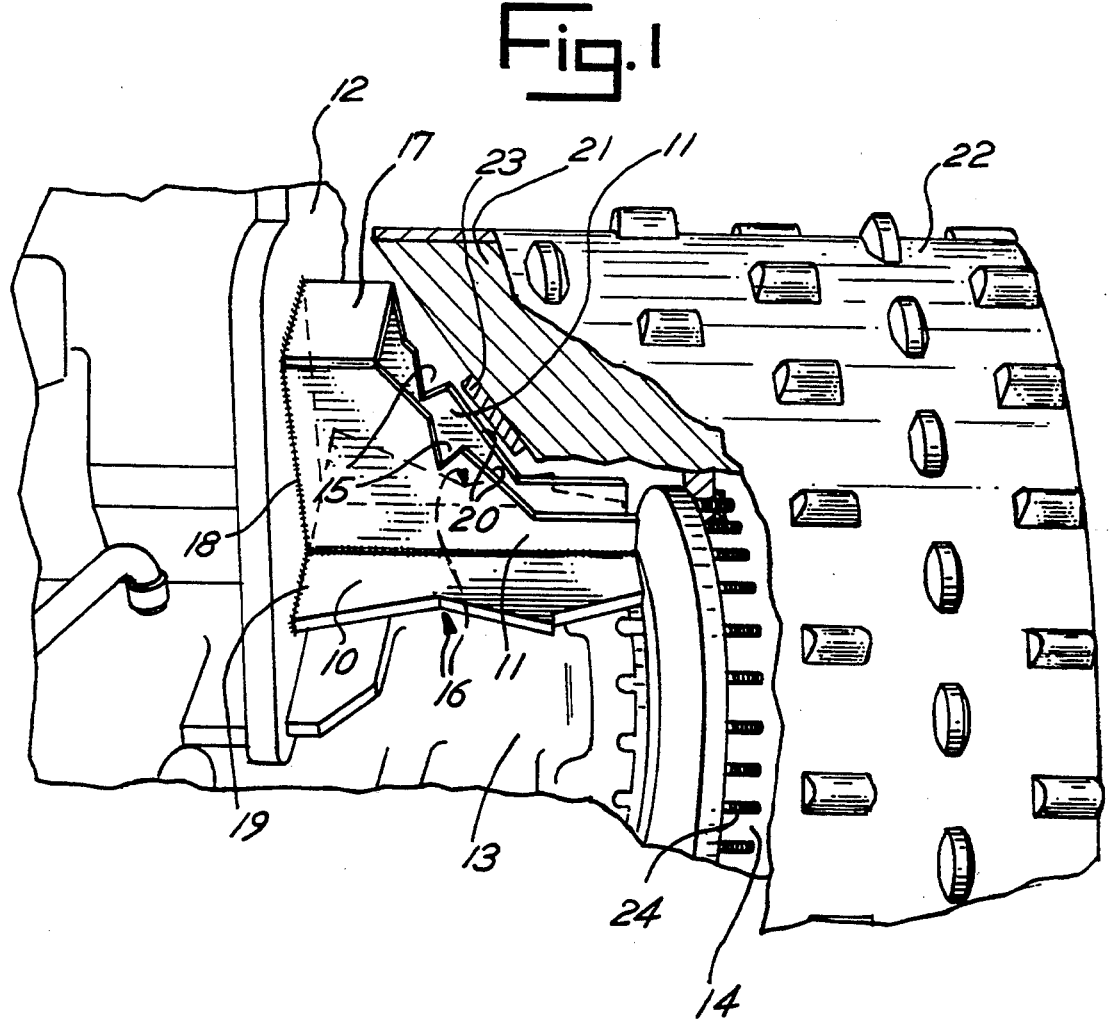
FIG. 1 is a perspective view of a portion of the frame of a wheeled tractor, having a front axle, a hub, a front wheel with a portion of the inside cone showing a wear bar, and a front cutter assembly.

FIG. 1 shows a front wire cutter assembly 10 fixedly attached to tractor frame 12 by vertical attachment 18 and horizontal attachment 19. Attachments 18 and 19 can be a weld, angle brackets, bolts, rivets or any other form of attachment known to the art, however, the preferred means of attachment is a weld. The front cutter assembly is cantilevered in a position parallel to and over axle 13. At the distal end of axle 13 is hub 14. Mounted to hub 14 using lugs 24 is wheel 22. Wheel 22 includes inside cone 21 having mounted thereto a plurality of wear bars 23 positioned circumferentially around cone 21.

The front cutter assembly 10 comprises two parallel L-shaped plates 11 having angled cutting surfaces 20 and at least two vertical v-shaped notches 15 and at least two horizontal v-shaped notches 16. The front cutter assembly may also include a cap plate 17. The materials of construction of the front cutter assembly are chosen from conventional structural materials that provide good wear resistance, yet low enough in material cost that the cutter assembly is economical to install and use. The preferred material for construction is mild steel plate, most preferably about one inch in thickness. The dimensions of the front cutter assembly are chosen such that when attached to the tractor frame 12, the cutting surfaces 20 are positioned in close proximity and substantially parallel to wear bars 23. Preferably the clearance distance between the cutting surfaces 20 and wear bars 23 is close enough to effect cutting or shearing of wire or other wrappings that come between cutting surfaces 20 and wear bars 23. Most preferably the clearance is approximately one quarter of an inch.

In operation the front cutter assembly provides at least two functions to prevent or eliminate entanglement of the front axle 13 with wire. As used in this application, the term "wire" shall include metal and plastic strapping, cable and any other materials that have a tendency to wrap around an axle and become entangled. The first function of the front cutter assembly is a cutting action that uses the circular motion of the wear bars 23 as they rotate with the movement of the wheels and their close proximity to the cutting surfaces 20. The circular motion of the wear bars occurs when wheel 22 rotates, thus rotating the inside cone 21 to which wear bars 23 are attached. As each wear bar passes in close proximity to the cutting surfaces, any wire that has worked its way between the axle and the wheel and inside cone will be cut in a scissor-like fashion.

The second function of the front cutter assembly is to provide a means for trapping wire before it becomes tightly entangled around the axle. V-shaped notches 15 and 16 trap the wire in the notch and prevent the wire from wrapping tightly around the axle. Because the wire is not tightly wrapped around the axle, the tractor operator or other maintenance personnel can easily manually cut and remove the trapped wire with conventional hand tools. Although repeated exposure to wire and other landfill debris will cause wear to the front cutter assembly, an optional cap plate 17 positioned on top and between L-shaped plates 11 will decrease the rate of wear and provide additional structural support for the parallel L-shaped plates.

Figure 2:
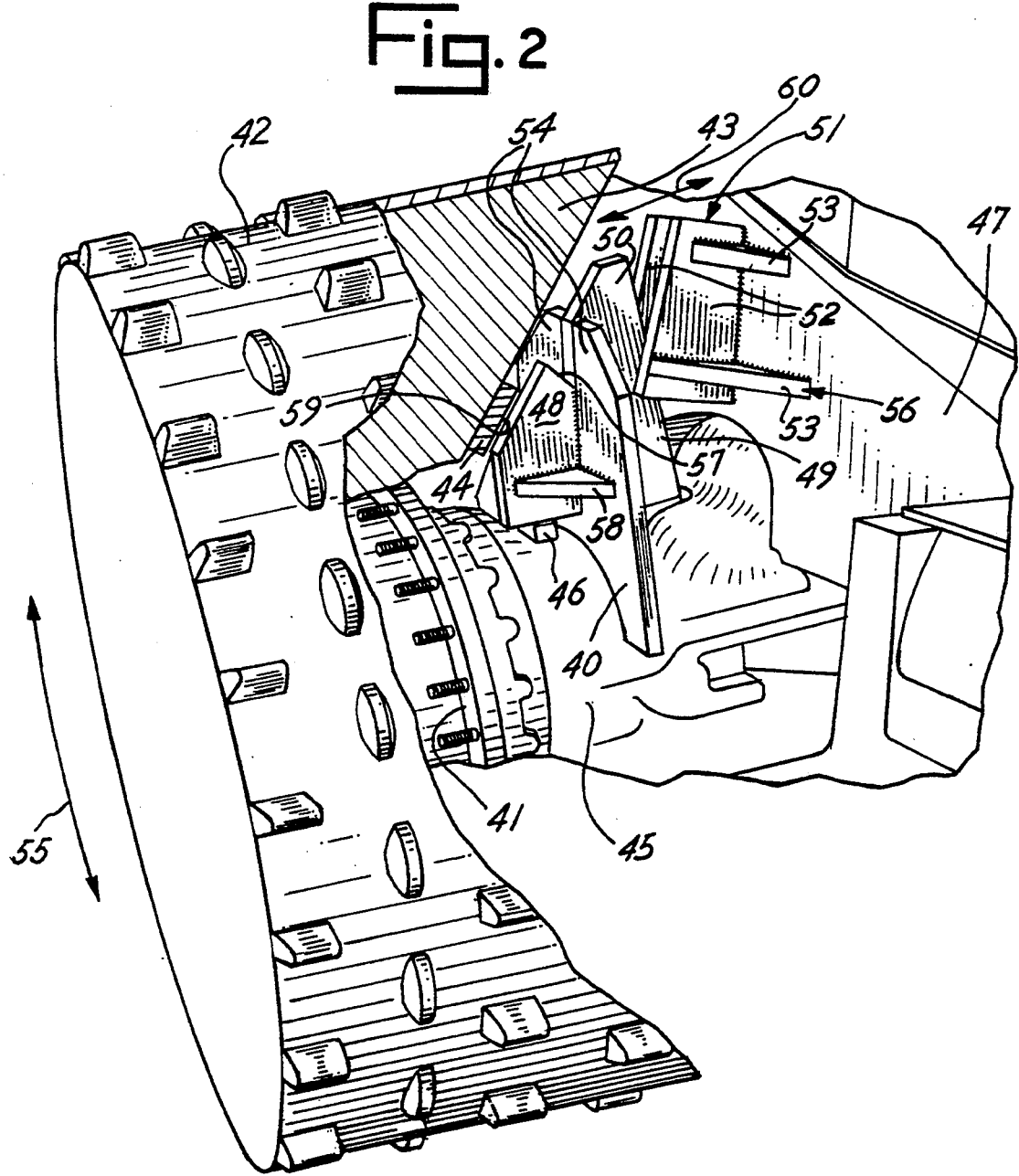
FIG. 2 is a perspective view of the rear portion of the frame of a wheeled tractor, having a rear axle, a hub, a rear wheel with a portion of the inside cone showing a wear bar, and a rear cutter assembly.

FIG. 2 illustrates a rear cutter assembly 40 that can be used alone or in combination with front cutter assembly 10. The rear cutter assembly comprise two jaws 49 and 51. Second jaw 51 is fixedly attached to the tractor frame 47 by horizontal supports 53. First jaw 49 is fixedly attached to axle 45 through attachment 46.

Second jaw 51 comprises at least two parallel cutting plates 52 fixedly attached to horizontal supports 53. Parallel cutting plates 52 and horizontal supports 53 are fixedly attached to the tractor frame 47 by frame attachments 56. Frame attachments 56 may be a weld, angle brackets, bolts, rivets, or any other form of attachment known to the art. The spatial distance between the parallel cutting plates is sufficient to allow second cutting plate 50 to pass freely between the parallel cutting plates in a rocking or in and cut manner.

First jaw 49 comprises a second cutting plate 50 attached to vertical supporting plates 54 which are in turn fixedly connected to axle 45 by axle attachment 46. Axle attachment 46 is bolted, welded, or otherwise fastened to axle 45. The second cutting plate 50 is supported in a vertical position and perpendicular to axle 46 by vertical supporting plates 54. A first cutting plate 48 is fixedly attached to vertical supporting plates 54 through at least one triangular support 57.

Attached to hub 41 is wheel 42 having inside cone 43 containing a plurality of wear bars 44. This wheel, cone and wear bars are similar in design and operation as those previously described with regard to the front cutter assembly. First jaw 49 is positioned and attached to axle 45 so that cutting surface 59 on cutting plate 48 is in close proximity to wear bars 44. Preferably the clearance between wear bars 44 and cutting surface 59 is about one quarter of an inch. First jaw 49 also includes a v-shaped notch 57 formed by the intersection of cutting plate 48 and vertical supporting plates 54.

Rear cutter assembly 40 allows cutting and removal of wire by three methods. The first method takes advantage of the undulating motion of axle 45 in a direction depicted by arrow 55. The undulation (or up and down motion) of axle 46 is caused by the vertical movement of wheel 42 as it rolls over and follows the contour of uneven ground terrain. First jaw 49 moves in synchronization with the undulating axle, thus causing cutting plate 50 to move in a scissor-like fashion in a direction depicted by arrow 60. The scissor-like movement of cutting plate 50 works in cooperation with parallel cutting plates 52, with cutting plate 50 moving in and out between parallel plates 52. Any wire that happens to get between cutting plate 50 and parallel plates 52 will be cut by the scissor-like action of first Jaw 49.

The second method to remove or prevent entanglement of wire involves the cooperation of the wear bars and cutting surface 59 of cutting plate 48. If wire gets between the axle and the wheel, a shearing effect is caused by the close clearance between the wear bar and cutting surface 59. As each wear bar rotates passed the cutting surface the shearing action works to cut the wire. This shearing action is similar to that described above with regard to wear bars 23 and cutting surface 20 on front wire cutter assembly 10.

The third method employed by rear cutter assembly 40 for removing wire involves the use of v-shaped notch 57. This method is similar to that described earlier with regard to the vertical v-shaped notches 15 and horizontal v-shaped notches 16 on front cutter assembly 10.

The foregoing description is presented for illustrative purposes only, and it is not intended to limit the scope of the invention of this application which is defined in the following claims.

What is claimed is:

1. A system for preventing wire or other wrappings from entangling the axles of a wheeled tractor that traverses ground having a defined contour, wherein the tractor has a frame, a front axle and a moveable rear axle that supports wheels having inside cones, each containing a series of wear bars attached to said cones, the system comprising, a front wire cutter assembly secured to said frame, said front wire cutter comprising two parallel plates extending outwardly from said frame above said front axle and in a direction substantially parallel to said front axle, each of said parallel plates positioned to be in close proximity to said wear bars creating cutting surfaces that cut wire or other wrappings that come between said cutting surfaces and said wear bars; and a rear wire cutter assembly comprising a first jaw and a second jaw, said first jaw having a first cutting plate and a second cutting plate, said first jaw is secured to said rear axle and moves in a rocking motion as said rear axle moves up and down as said wheels move and follow the contour of the ground, said second jaw secured to said frame and having two parallel plates spaced a distance apart to accept said second cutting plate as said first jaw moves in a scissor-like fashion with respect to second jaw as a result of the rocking motion of said rear axle.

2. The system of claim 1 wherein the front wire cutter assembly includes at least one v-shaped notch on each parallel plate to catch wire or other wrappings to allow for manual cutting.

3. The system of claim 1 wherein the rear wire cutter assembly includes at least one v-shaped notch on the first jaw to catch wire or other wrappings to allow for manual cutting.

4. A system for preventing wire or other wrappings from entangling the axles of a wheeled tractor that traverses ground having a defined contour, wherein the tractor has a frame, a front axle and a moveable rear axle that support wheels having inside cones, each containing a series of wear bars attached to said cones, the system comprising, a rear wire cutter assembly comprising a first jaw and a second jaw, said first jaw having supporting plates, a first cutting plate and a second cutting plate, said first jaw is secured to said rear axle and moves in a rocking motion as said rear axle moves up and down as said wheels over and follow contour of the ground, said second jaw secured to said frame and having two parallel plates spaced a distance apart to accept said second cutting plate as said second plate moves in a scissor-like fashion as a result of the rocking motion of said rear axle.

5. The system of claim 4 wherein the rear wire cutter assembly includes at least one v-shaped notch on the first jaw to catch wire or other wrapping and allow for manual cutting.

6. A system for preventing wire or other wrappings from entangling the axles of a wheeled tractor that traverses ground having a defined contour, wherein the tractor has a frame, a front axle and a moveable rear axle that support wheels having inside cones, each containing a series of wear bars attached to said cones, the system comprising, a front wire cutter assembly secured to said frame, said front wire cutter comprising two parallel plates extending outwardly from said frame above said front axle and in a direction substantially parallel to said front axle, each of said parallel plates includes at least one v-shaped notch to catch wire or other wrappings to allow for manual cutting and each of said parallel plates positioned to be in close proximity to said wear bars creating a cutting surfaces that cut wire or other wrappings that come between said cutting surfaces and said wear bars.

* * * * *